(12) United States Patent
Smith, III

(10) Patent No.: US 7,063,328 B2
(45) Date of Patent: Jun. 20, 2006

(54) UNDERSEA HYDRAULIC COUPLING WITH SEAL RETAINER

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 10/285,062

(22) Filed: Oct. 31, 2002

(65) Prior Publication Data

US 2004/0084902 A1 May 6, 2004

(51) Int. Cl.
*F16L 29/00* (2006.01)
(52) U.S. Cl. ............... 277/607; 277/277; 277/608; 277/616; 277/628; 285/108; 137/614.04
(58) Field of Classification Search .......... 277/602, 277/603, 607, 608, 609, 616, 628, 637; 137/614.04, 137/614; 285/108, 111
See application file for complete search history.

(56) References Cited

U.S. PATENT DOCUMENTS

| | | | |
|---|---|---|---|
| 2,753,195 A | 7/1956 | Palmer | 284/184 |
| 4,294,473 A | 10/1981 | Ekman | 285/50 |
| 4,694,859 A | 9/1987 | Smith, III | 137/614.04 |
| 4,709,726 A | 12/1987 | Fitzgibbons | 137/614.04 |
| 4,768,538 A | 9/1988 | Mintz et al. | 137/15 |
| 4,832,080 A | 5/1989 | Smith, III | 137/614.04 |
| 4,834,139 A | 5/1989 | Fitzgibbons | 137/614.04 |
| 4,884,584 A | 12/1989 | Smith | |
| 4,900,071 A | 2/1990 | Smith, III | 285/379 |
| 5,052,439 A | 10/1991 | Smith, III | 137/614.04 |
| 5,099,882 A | 3/1992 | Smith, III | 137/614.04 |
| 5,103,868 A | 4/1992 | Wilkins | 137/614.03 |
| 5,203,374 A | 4/1993 | Smith, III | 137/614.04 |
| 5,232,021 A | 8/1993 | Smith, III | 137/614.04 |
| 5,337,782 A | 8/1994 | Wilcox | 137/614.03 |
| 5,339,861 A | 8/1994 | Smith, III | 137/614.04 |
| 5,343,891 A | 9/1994 | Bosley | 137/614.04 |
| 5,368,070 A | 11/1994 | Bosley | 137/614.04 |
| 5,494,073 A | 2/1996 | Saito | 137/614.03 |
| 5,556,139 A | 9/1996 | Wilkins | 285/111 |
| 5,762,106 A | 6/1998 | Smith, III | 137/614.04 |
| 5,771,927 A | 6/1998 | Johansen et al. | 137/614.04 |
| 5,810,047 A | 9/1998 | Kirkman | 137/614.01 |
| 5,979,499 A * | 11/1999 | Smith | 137/614.04 |
| 5,983,934 A | 11/1999 | Smith, III | 137/614.04 |
| 6,085,785 A * | 7/2000 | Smith, III | 137/614.04 |
| 6,161,579 A | 12/2000 | Vulliet | |
| 6,202,690 B1 * | 3/2001 | Smith, III | 137/614.04 |
| 6,202,691 B1 | 3/2001 | Smith, III | 137/614.04 |
| 6,575,430 B1 | 6/2003 | Smith, III | |

FOREIGN PATENT DOCUMENTS

| | | |
|---|---|---|
| DE | 69711862 T2 | 4/2002 |
| GB | 2388637 | 11/2003 |
| WO | WO 99/04191 | 2/1999 |

* cited by examiner

*Primary Examiner*—Enoch E. Peavey
(74) *Attorney, Agent, or Firm*—Wong, Cabello Lutsch, Rutherford & Brucculeri, LLP

(57) ABSTRACT

An undersea hydraulic coupling member has a seal retainer that holds and secures a plurality of annular seals that may be removed from the coupling member together with the seal retainer. At least one of the seals is a pressure energized hollow metal seal. The seal retainer includes a shell that engages the coupling member and a seal carrier that holds the annular seals.

18 Claims, 6 Drawing Sheets

UNDERSEA HYDRAULIC COUPLING WITH SEAL RETAINER

BACKGROUND

1. Field of the Invention

This invention relates, in general, to hydraulic couplings, and specifically to hydraulic couplings used in undersea drilling and production applications. More particularly, the invention involves undersea hydraulic couplings having seal retainers that hold and retain seals between the coupling members.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical seal retainer. When the male and female portions of the coupling are parted under pressure, the seal retainer prevents the metal seal from blowing out through the bore of the female member.

U.S. Pat. Nos. 4,900,071 and 5,052,439 to Robert E. Smith III disclose an undersea hydraulic coupling with an elastomeric seal that is restrained from radial movement into the central bore of the female member by a circumferential shoulder on one or both surfaces adjacent the seal. Preferably, the seal has a dovetail interfit with one or both surfaces. U.S. Pat. Nos. 5,099,882, 5,203,374, 5,232,021 to Robert E. Smith III also show undersea hydraulic couplings with these seals. An inner cylindrical surface of the annular seal engages the circumference of the male member or probe as the probe is inserted into the female member. As the male member or probe is pulled out of the female member bore, the leading face of the male member reaches the soft annular seal intermediate that bore. When the face reaches the midpoint of the soft annular seal, the dovetail interfit prevents the seal being imploded into the bore, as the seawater and/or hydraulic fluid enter the bore at high pressure.

To retain one or more seals in the female member of an undersea hydraulic coupling, a seal retainer may be connected to the female member. The seal retainer may be a generally sleeve-shaped cylindrical body that is inserted into the bore of the female member until the seal retainer abuts a shoulder in the bore of the female member. To secure the seal retainer against the shoulder, a retainer locking member may also be attached to the female member using threads or snap rings, for example. A radial seal may be retained by the seal retainer. For example, the seal retainer may hold a pressure energized radial metal seal on a shoulder in the female member bore.

Although seals that are retained in the female coupling members of subsea hydraulic couplings may be reusable, the seals periodically may be removed and/or replaced. To remove the seals, the male coupling member must be disconnected from the female coupling member, and the seal retainer must be disconnected and disengaged from the female coupling member.

Seals that are retained in the bore of the female coupling member may be difficult to reach because of the length and narrow diameter of the female bore. In some cases, seals may become stuck in the female member bore because of wear or deformation of the seals, or because the outer diameter of the seals become compressed against the wall of the female member bore adjacent the shoulder on which the seals are positioned.

Removing and replacing seals in undersea hydraulic couplings may be difficult without a tool to reach into the female member bore and pry or pull the seal out. However, the tool may scratch the female member bore and damage the sealing surfaces. For these reasons, removing and replacing the seals in undersea hydraulic couplings is a problem.

Thus, undersea hydraulic couplings are needed having retained seals that may be easily removed and replaced. Undersea hydraulic couplings also are needed that have retained seals that may be removed and replaced without damage to the coupling, and especially without damage to the sealing surfaces. Undersea hydraulic couplings are needed with seal retainers that reduce or eliminate the need for a tool to remove and replace seals from the bore of the female coupling member.

SUMMARY OF THE INVENTION

The present invention provides an undersea hydraulic coupling with a seal retainer that facilitates removal of seals as a single unit. A plurality of annular seals are held and secured by the seal retainer, and are removable from the hydraulic coupling member with the seal retainer. The seal retainer is useful and reliable in high pressure and high temperature applications, and reduces or eliminates risk of damaging the body or bore of the coupling member when changing seals.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
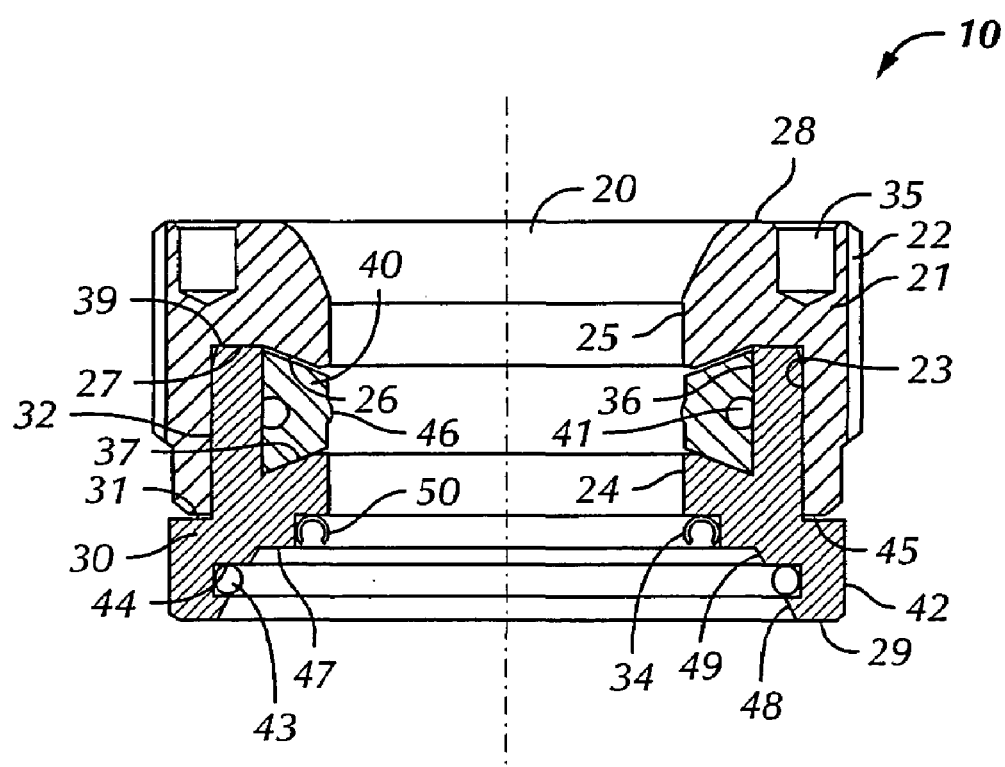
FIG. 1 is a section view of the seal retainer of the present invention according to a first embodiment.

As shown in FIG. 1, in a first embodiment, seal retainer 10 comprises shell 21 and seal carrier 30, with central bore 20 extending therethrough. The seal carrier fits together with the shell to form a seal retainer that may be inserted and removed from the female undersea hydraulic coupling member.

In a first embodiment, the shell is a generally ring-shaped body with an outer diameter 22 that may be threaded to engage the female coupling member. The shell has first end 28, second end 45, first larger inner diameter 23, second smaller inner diameter 25, and internal shoulder 27 between the first and second inner diameters. The shell also may include negative or reverse angle shoulder 26 that extends radially inwardly from internal shoulder 27. Holes 35 may be included in the first end of the shell, and a spanner or other tool may be inserted into the holes to rotate the shell to engage or disengage it from the female member.

In the first embodiment, the seal carrier is a generally ring shaped sleeve, part of which engages or fits at least partially into the shell. The seal carrier has first end 39 which fits into the shell, second end 29, first larger outer diameter 42, second smaller outer diameter 32, first larger inner diameter 36, and second smaller inner diameter 24. In one embodiment, the seal carrier may have negative or reverse angle shoulder 37 between the first larger inner diameter and second smaller inner diameter. The seal carrier also may include outer shoulder 31 between the first larger outer diameter and the second smaller outer diameter.

In one embodiment, the first end of the seal carrier slides into the first larger inner diameter of 23 of the shell. There may be little or no clearance between the second smaller outer diameter of the seal carrier and the inner diameter of the shell, or there may be a slight interference fit. When the first end of the seal carrier is fully inserted into the shell, the first end 39 may abut internal step 27 of the shell, and second end 45 of the shell may abut outer shoulder 31 of the seal carrier.

In the embodiment of FIG. 1, first annular seal 50 and second annular seal 43 are held and secured in place by the seal retainer, and may be inserted or removed as a single unit when the seal retainer is inserted or removed from the female member receiving chamber. First and second annular seals 50, 43 may be positioned and seated on two of internal shoulders 34, 47 and 44 that are adjacent the second end 29 of the seal carrier. First annular seal 50 may have a press fit or slight interference fit into the seal carrier to position and seat the seal on internal shoulder 34.

In this embodiment, first annular seal 50 may be a pressure-energized hollow metal seal with a generally C-shaped cross section. Pressurized fluid may enter the hollow portion of first annular seal 50 to urge the seal to expand radially outwardly to seal against the seal carrier, and radially inwardly to seal against the probe of the male coupling member.

Second annular seal 43 may have a press fit or slight interference fit with the seal carrier as the seal is positioned and seated on shoulder 44. In this embodiment, second annular seal 43 may be an elastomeric O-ring. Alternatively, the second annular seal may be a metal seal such as a pressure energized hollow metal seal.

In one embodiment, the seal retainer holds third annular seal 40 between reverse angled shoulders 26 and 37 that restrain the seal from implosion into central bore 20. Third annular seal 40 may be an elastomeric ring with a dovetail cross section, and may have a dovetail interfit between the reverse angled shoulders. Inner diameter 46 of the third annular seal may extend farther into the central bore than the smaller inner diameters of the shell or seal carrier, to seal radially with the male member when the male member is in the receiving chamber. O-ring 41 may be positioned around the third annular seal's outer diameter.

Figure 2:
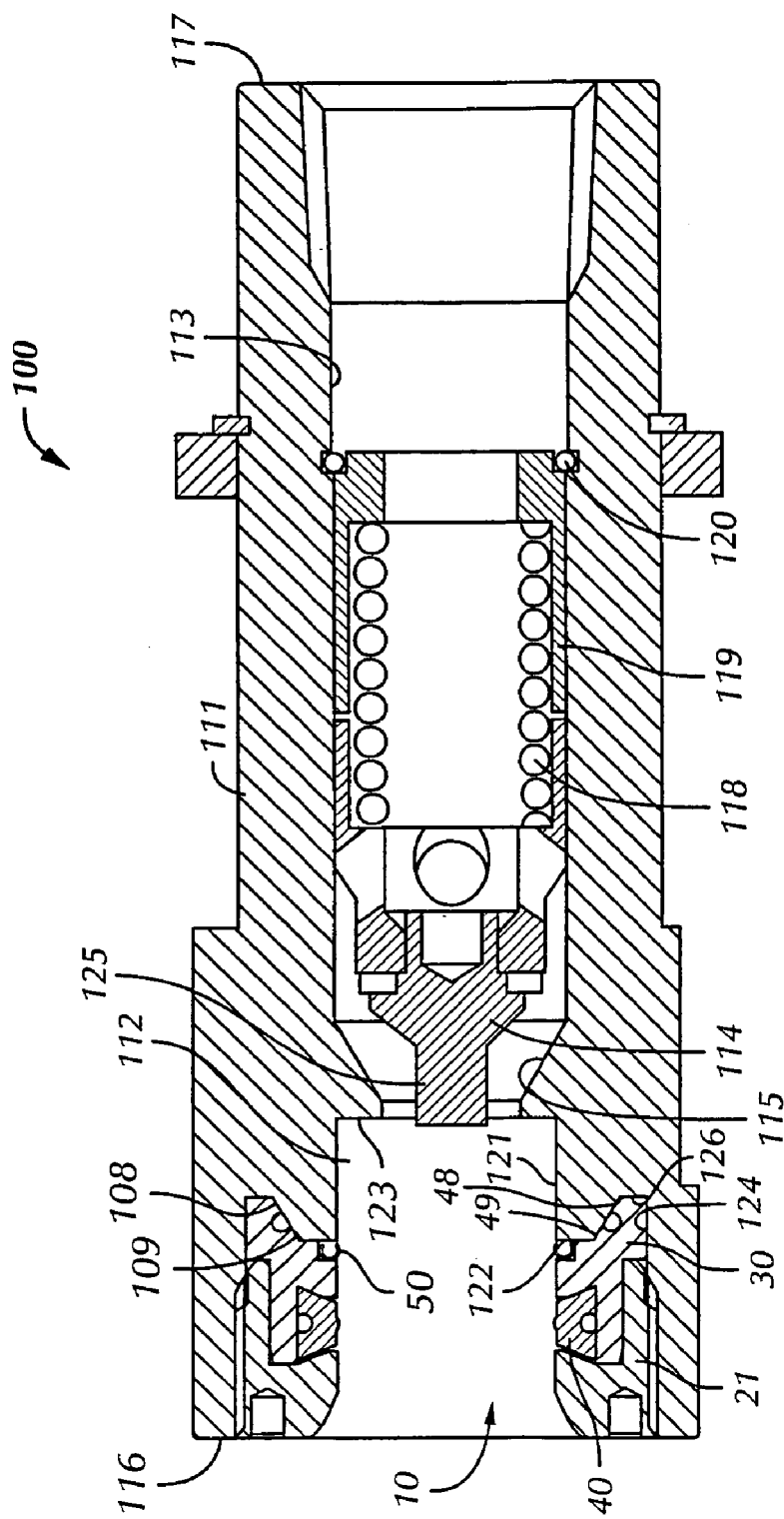
FIG. 2 is a section view of a female coupling member with the seal retainer according to the first embodiment.

In the embodiment of FIG. 1, the seal carrier has metal sealing surfaces 48, 49 adjacent second end 29. These metal sealing surfaces are integral with the second end of the seal carrier, and preferably are angled or beveled to provide a sealing surface that mates with angled or beveled surfaces on the female coupling member. As shown in FIG. 2, the metal sealing surfaces 48, 49 on the seal carrier may form metal to metal seals with surfaces 108 and 109 of female coupling member 100 when the seal retainer is fully engaged to the female coupling member.

The seal retainer also may engage one or more surfaces in receiving chamber 112 of the female coupling member. For example, the threaded outer circumference of the shell may engage first section 124 of the receiving chamber which may be at least partially threaded. Shoulders 29 and 47 of the seal carrier may abut shoulders 122 and 126 in the receiving chamber.

In the embodiment of FIG. 2, the female coupling member has body section 111 with first end 116 and second end 117. Poppet valve 114 slides within bore 113 to control fluid flow through the female coupling member. The poppet valve may be biased by spring 118 to a closed position against valve seat 115. The valve spring may be held between the poppet valve and spring collar 119, which is held in the bore by snap ring or collar clip 120. Valve actuator 125 may extend from the face of the valve. When a male coupling member probe is inserted into receiving chamber 112, the probe may have a sliding interfit with the second section 121 of the receiving chamber until the male member approaches or abuts shoulder 123. The valve actuator of the male member may engage the valve actuator of the female member to open the poppet valves for fluid flow between the coupling members.

Figure 3:
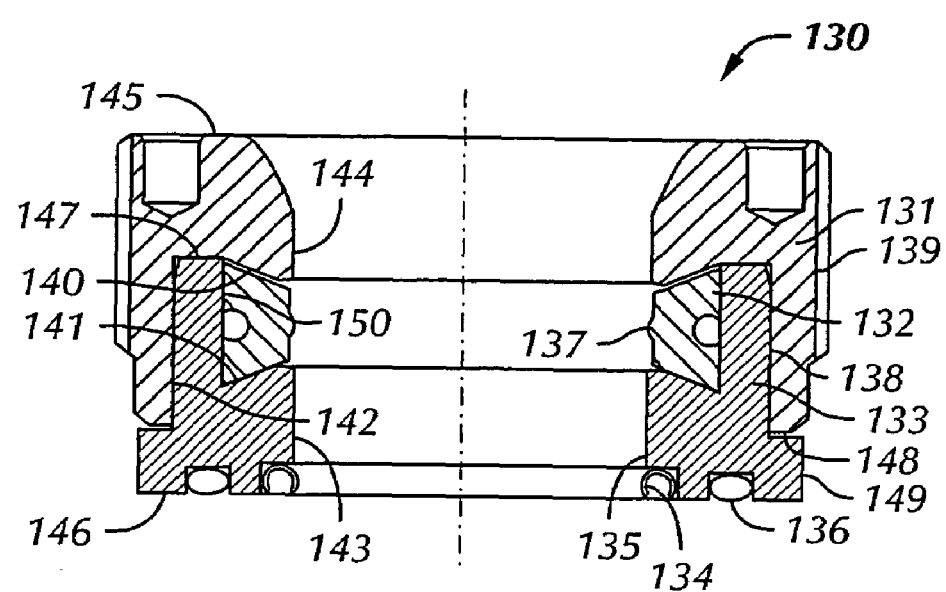
FIG. 3 is a section view of the seal retainer of the present invention according to a second embodiment.

In an embodiment of the invention shown in FIG. 3, seal retainer 130 comprises shell 131 and seal carrier 133. The shell has a threaded outer diameter 139 that engages the female coupling member, first end 145, second end 148, first larger inner diameter 144 and second smaller inner diameter 142. The seal carrier has first end 147 that fits into the shell, second end 146, first larger inner diameter 150, second smaller inner diameter 143, first larger outer diameter 149, and second smaller outer diameter 138 that fits into the first larger inner diameter of the shell.

In this embodiment, the seal retainer holds first annular seal 134 and second annular seal 136 at or adjacent the second end 146 of the seal carrier. Both seals may be held and secured in place by the seal retainer, so that they may be inserted or removed as a single unit with the seal retainer from the female member receiving chamber. First and second annular seals 134, 136 may be positioned or seated on shoulders or grooves in the second end of the seal carrier. For example, first annular seal 134 may have a press fit or slight interference fit with the seal carrier as the seal is positioned on shoulder 135.

First annular seal 134 may be a pressure-energized hollow metal seal with a generally C-shaped cross section. Pressurized fluid may enter the hollow portion of first annular seal 134 to urge the seal to expand radially outwardly to seal against the seal carrier, and expand radially inwardly further than the second smaller inner diameter 143 of the seal carrier so that the first annular seal contacts and seals against the probe of the male coupling member. Second annular seal 136 may fit into an annular groove in the second end of the seal carrier. Second annular seal 43 may be an elastomeric O-ring or metal seal.

In the embodiment of FIG. 3, third annular seal 132 may have an interfit between reverse angled shoulder 140 of the shell and reverse angled shoulder 141 of the seal carrier, both of which restrain the seal from implosion. Annular seal 132 may be an elastomeric seal with a dovetail cross section and an inner diameter 137 that extends into the receiving chamber further than the second smaller inner diameter 143 of the seal carrier and the second smaller inner diameter 144 of the shell, and forms a seal with the male coupling member.

Figure 4:
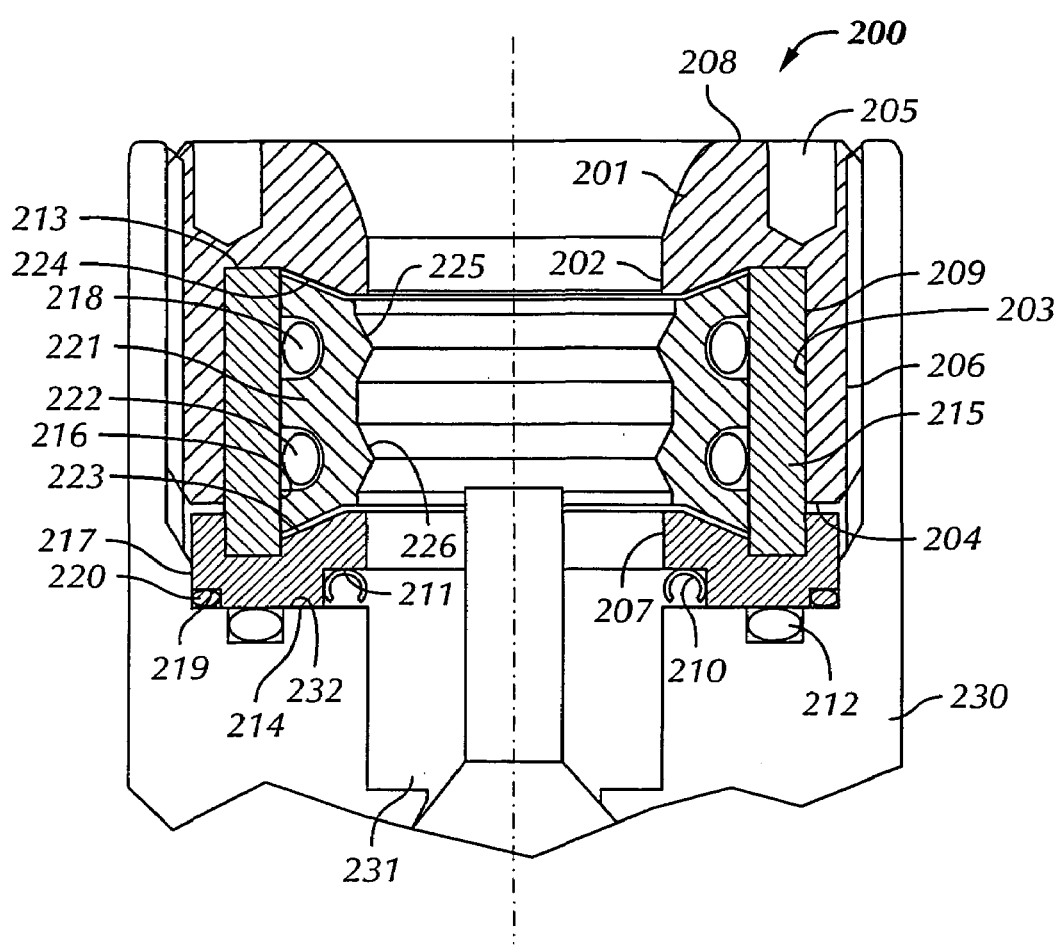
FIG. 4 is a partial section view of the seal retainer of the present invention in a female coupling member according to a third embodiment.

In an embodiment of the invention shown in FIG. 4, seal retainer 200 comprises shell 201 and seal carrier 215 that may be inserted into receiving chamber 231 of female coupling member 230. The seal retainer may abut shoulder 232 in the receiving chamber when it is fully inserted. The shell may have threaded outer diameter 206 to engage the female coupling member, first end 208, second end 204, first larger inner diameter 203, and second smaller inner diameter 202. The first end of the shell may have holes 205 to permit turning of the shell with a suitable tool. The seal carrier has first end 213, second end 214, first larger inner diameter 216, second smaller inner diameter 207, first larger outer diameter 217, and second smaller outer diameter 209 that fits into the first larger inner diameter of the shell.

In this embodiment, the seal retainer holds first annular seal 210 and second annular seal 220 at the second end 214 of the seal carrier. Both seals may be held and secured in place by the seal retainer, and may be inserted or removed as a single unit along with the seal retainer. First and second annular seals 210, 220 may be positioned or seated on shoulders or grooves in the second end of the seal carrier. For example, first annular seal 210 may have a press fit or slight interference fit with the seal carrier as the seal is positioned on shoulder 211.

First annular seal 210 may be a pressure-energized hollow metal seal with a generally C-shaped cross section. Pressurized fluid may enter the hollow portion of the first annular seal to urge the seal to expand radially outwardly to seal against the seal carrier, and radially inwardly further than the second smaller inner diameter 207 of the seal carrier, to seal against the probe of the male coupling member. Second annular seal 220 may fit into annular groove 219 at the corner or edge of the seal carrier. In this embodiment, second annular seal 220 may be a hollow metal O-ring seal.

In the embodiment of FIG. 4, third annular seal 221 may be held in place between reverse angled shoulder 224 of the shell and reverse angled shoulder 223 of the seal carrier, which restrain the seal from implosion. Annular seal 221 may be an elastomeric seal with a dovetail cross section and inwardly extending sealing surfaces 225, 226 at the seal's inner diameter that extend inwardly into the receiving chamber further than the second smaller inner diameter 202 of the shell or the second smaller inner diameter 207 of the seal carrier. Annular seal 221 also may have a pair of O-rings 218, 222 around the seal's outer circumference.

The embodiment of FIG. 4 also includes a fourth annular seal 212 positioned in a groove in shoulder 232 in the female member receiving chamber. In this embodiment, seal 212 may be an elastomeric O-ring that seals with the second end of the seal carrier.

Figure 5:
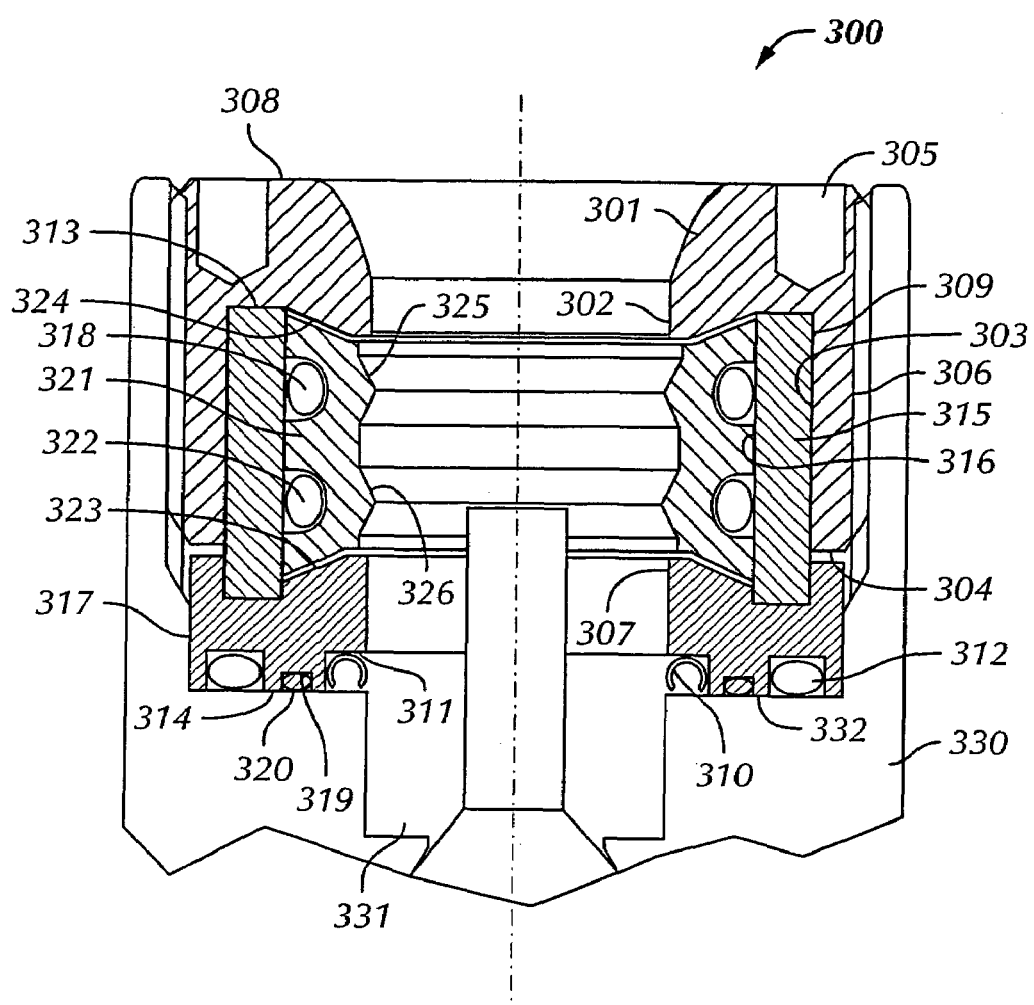
FIG. 5 is a partial section view of the seal retainer of the present invention in a female coupling member according to a fourth embodiment.

In an embodiment of the invention shown in FIG. 5, seal retainer 300 comprises shell 301 and seal carrier 315. The seal retainer may be inserted into receiving chamber 331 of female coupling member 330 until the seal retainer contacts shoulder 332. The shell may have threaded outer diameter 306 to engage the female coupling member, first end 308, second end 304, first larger inner diameter 303, and second smaller inner diameter 302. The first end of the shell may have holes 305 to permit turning the shell with a suitable tool. The seal carrier has first end 313, second end 314, first larger inner diameter 316, second smaller inner diameter 307, first larger outer diameter 317, and second smaller outer diameter 209 that fits into the first larger inner diameter of the shell.

In this embodiment, the seal retainer holds first annular seal 310, second annular seal 320, and third annular seal 312 at the second end 314 of the seal carrier. These seals not only may be held in place by the seal retainer, but also may be inserted or removed as a single unit with the seal retainer. The first, second and third annular seals 310, 320 and 312 may be positioned or seated on shoulders or grooves in the second end of the seal carrier. For example, first annular seal 310 may have a press fit or slight interference fit with the seal carrier as the seal is positioned on shoulder 311.

First annular seal 310 may be a pressure-energized hollow metal seal with a generally C-shaped cross section. Pressurized fluid may enter the hollow portion of the first annular seal to urge the seal to expand radially outwardly to seal against the seal carrier, and radially inwardly to seal against the probe of the male coupling member. Second annular seal 320 may fit into annular groove 319 in the second end of the seal carrier. In this embodiment, second annular seal 320 may be a hollow metal O-ring seal. Third annular seal 312 also may fit into an annular groove in the second end of the seal carrier. In this embodiment, the third annular seal may be an elastomeric O-ring seal.

In the embodiment of FIG. 5, fourth annular seal 321 may be held in place between reverse angled shoulder 324 of the shell and reverse angled shoulder 323 of the seal carrier, which restrain the seal from implosion. Annular seal 321 may be an elastomeric seal with a dovetail cross section and inwardly extending sealing surfaces 325, 326 at the seal's inner diameter to seal with the male coupling member. Annular seal 321 also may have a pair of O-rings 318, 322 around the seal's outer circumference.

Figure 6:
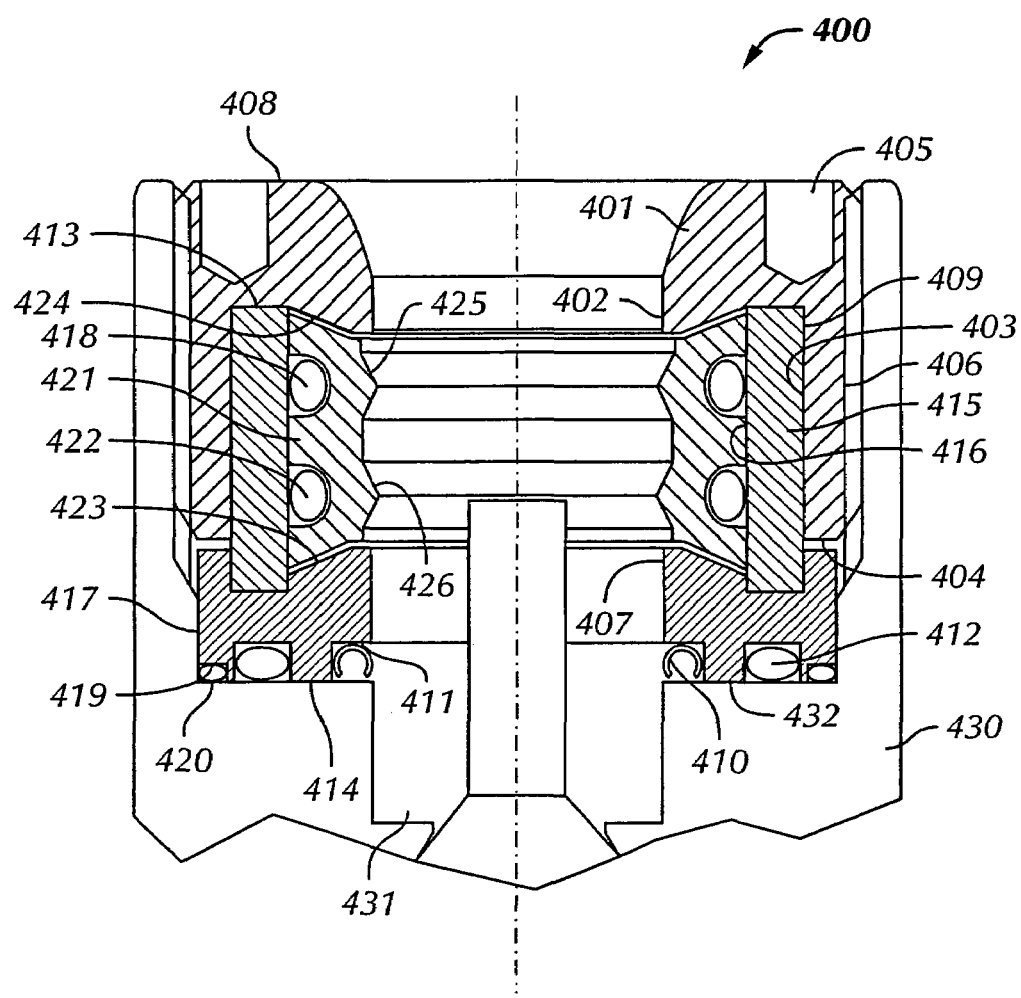
FIG. 6 is a partial section view of the seal retainer of the present invention in a female coupling member according to a fifth embodiment.

In an embodiment of the invention shown in FIG. 6, seal retainer 400 comprises shell 401 and seal carrier 415. The seal retainer may be inserted into receiving chamber 431 in female member 430 until the seal retainer abuts shoulder 432. The shell may have threaded outer diameter 406 to engage the female coupling member, first end 408, second end 404, first larger inner diameter 403, and second smaller inner diameter 402. The seal carrier has first end 413, second end 414, first larger inner diameter 416, second smaller inner diameter 407, first larger outer diameter 417, and second smaller outer diameter 409 that fits into the first larger inner diameter of the shell.

In this embodiment, the seal retainer holds first annular seal 410, second annular seal 412, and third annular seal 420 at the second end 414 of the seal carrier. These seals may be held in place by the seal retainer, and may be inserted or removed as a single unit with the seal retainer. The first, second and third annular seals 410, 412 and 420 may be positioned or seated on shoulders or grooves in the second end of the seal carrier. For example, first annular seal 410 may have a press fit or slight interference fit with the seal carrier as the seal is positioned on shoulder 411.

First annular seal 410 may be a pressure-energized hollow metal seal with a generally C-shaped cross section. Pressurized fluid may enter the hollow portion of the first annular seal to urge the seal to expand radially outwardly to seal against the seal carrier, and radially inwardly to seal against the probe of the male coupling member. Second annular seal 412 may fit into an annular groove in the second end of the seal carrier. In this embodiment, second annular seal 412 may be an elastomeric O-ring seal. Third annular seal 420 may fit into annular groove 419 in the second end of the seal carrier. In this embodiment, the third annular seal may be a hollow metal seal.

In the embodiment of FIG. 6, fourth annular seal 421 may be held in place between reverse angled shoulder 424 of the shell and reverse angled shoulder 423 of the seal carrier, which restrain the seal from implosion. Annular seal 421 may be an elastomeric seal with a dovetail cross section and inwardly extending sealing surfaces 425, 426 at the seal's inner diameter to seal with the male coupling member. Annular seal 421 also may have a pair of O-rings 418, 422 around the seal's outer circumference.

Although variations in the embodiment of the present invention may not each realize all the advantages of the invention, certain features may become more important than others in various applications of the device. The invention, accordingly, should be understood to be limited only by the scope of the appended claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An undersea hydraulic coupling member, comprising:
    a body having an internal bore and a shoulder intermediate the bore;
    a seal retainer insertable into the bore to abut the shoulder, the seal retainer having an outer shell and an inner seal carrier, the inner seal carrier sliding into the outer shell; and
    a first annular metal seal and a second annular metal seal positioned on the seal carrier; the first and the second annular metal seals insertable into and removable from the undersea hydraulic coupling together with the inner seal carrier.

2. The undersea hydraulic coupling member of claim 1 wherein the first annular metal seal is a pressure energized hollow metal seal.

3. The undersea hydraulic coupling member of claim 1 wherein the second annular metal seal is a hollow metal O-ring.

4. The undersea hydraulic coupling member of claim 1 wherein the second annular metal seal is integral with the seal carrier.

5. The undersea hydraulic coupling member of claim 1 further comprising a third annular seal positioned between the outer shell and inner seal carrier.

6. The undersea hydraulic coupling member of claim 5 wherein the outer shell and inner seal carrier have a dovetail interfit with the third annular seal.

7. An undersea hydraulic coupling member comprising:
    a body having an internal bore with a first end and a second end, a valve to control hydraulic fluid flow through the bore, a receiving chamber at the second end of the bore and a beveled, circumferential, metal sealing surface in the receiving chamber; and
    a seal retainer in the receiving chamber; the seal retainer having an interior end, an exterior end, an inner diameter, a shoulder, and a first annular metal seal retained on the shoulder at the inner diameter, the seal retainer having an integral, beveled, circumferential, metal sealing surface between the shoulder and the interior end to seal by direct metal-to-metal contact with the metal sealing surface in the receiving chamber.

8. The undersea hydraulic coupling member of claim 7 wherein the seal retainer comprises an outer shell and an inner seal carrier.

9. The undersea hydraulic coupling member of claim 7 wherein the first annular metal seal is positioned on a shoulder at the inner diameter of the seal retainer.

10. The undersea hydraulic coupling member of claim 7 further comprising an annular elastomeric seal having a dovetail interfit with the seal retainer.

11. The undersea hydraulic coupling member of claim 7 wherein the seal retainer is threaded to the undersea hydraulic coupling member.

12. A seal retainer for a female undersea hydraulic coupling member comprising:
    a shell to engage the female undersea hydraulic coupling member; the shell having an internal shoulder;
    a seal carrier having a first end, a second end, and an internal shoulder; the first end of the seal carrier fitting at least partially inside the shell;
    a first annular metal seal and a second annular metal seal secured to the seal carrier at the second end thereof;
    a third annular seal secured between the internal shoulder of the shell and the internal shoulder of the seal carrier.

13. The seal retainer of claim 12 wherein the third annular seal has a dovetail interfit between the internal shoulder of the shell and the internal shoulder of the seal carrier.

14. The seal retainer of claim 12 further comprising a second internal shoulder on the seal carrier; the first annular metal seal seating on the second internal shoulder.

15. The seal retainer of claim 12 further comprising a fourth annular seal between the seal carrier and the female undersea hydraulic coupling member.

16. The seal retainer of claim 15 wherein the fourth annular seal is a metal seal.

17. The seal retainer of claim 12 wherein the first annular metal seal is a pressure energized C-shaped metal seal.

18. The seal retainer of claim 12 wherein the second annular metal seal is integral with the second end of die seal carrier.

* * * * *